United States Patent
Reyes et al.

(10) Patent No.: US 10,005,952 B2
(45) Date of Patent: Jun. 26, 2018

(54) HYDROFLUORIC ACIDIZING COMPOSITIONS FOR SUBSEA RISER SYSTEMS AND MODULATING AGENT FOR HYDROFLUORIC ACIDIZING COMPOSITION

(71) Applicant: Halliburton Energy Services, Inc., Houston, TX (US)

(72) Inventors: Enrique Reyes, Tomball, TX (US); Natalie Pascarella, Houston, TX (US); James Rosthorn, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 11 days.

(21) Appl. No.: 15/036,042

(22) PCT Filed: Jul. 16, 2014

(86) PCT No.: PCT/US2014/046848
§ 371 (c)(1),
(2) Date: May 11, 2016

(87) PCT Pub. No.: WO2015/088587
PCT Pub. Date: Jun. 18, 2015

(65) Prior Publication Data
US 2016/0280989 A1    Sep. 29, 2016

Related U.S. Application Data

(63) Continuation-in-part of application No. PCT/US2013/074440, filed on Dec. 11, 2013.

(51) Int. Cl.
*E21B 43/28* (2006.01)
*C09K 8/74* (2006.01)
*C09K 8/54* (2006.01)
*E21B 17/01* (2006.01)
*E21B 43/25* (2006.01)

(52) U.S. Cl.
CPC .................. *C09K 8/74* (2013.01); *C09K 8/54* (2013.01); *E21B 17/01* (2013.01); *E21B 43/25* (2013.01); *E21B 43/28* (2013.01); *C09K 2208/32* (2013.01)

(58) Field of Classification Search
CPC ........ C09K 8/74; C09K 8/54; C09K 2208/32; E21B 17/01; E21B 43/25; E21B 43/28
USPC ........................................................ 166/307
See application file for complete search history.

(56) References Cited

U.S. PATENT DOCUMENTS

| | | | |
|---|---|---|---|
| 3,222,289 A | 12/1965 | Clark et al. | |
| 6,001,186 A | 12/1999 | Johnson et al. | |
| 7,855,168 B2 | 12/2010 | Fuller et al. | |
| 2004/0235677 A1* | 11/2004 | Nguyen | C09K 8/032 507/200 |
| 2005/0006900 A1* | 1/2005 | Lewis | B21C 1/22 285/370 |
| 2005/0189113 A1* | 9/2005 | Cassidy | C09K 8/524 166/307 |
| 2006/0013798 A1* | 1/2006 | Henry | A61K 31/785 424/78.09 |
| 2006/0219661 A1 | 10/2006 | Towse et al. | |
| 2007/0281868 A1 | 12/2007 | Pauls et al. | |
| 2008/0280046 A1 | 11/2008 | Bryden et al. | |
| 2009/0042748 A1 | 2/2009 | Fuller | |
| 2009/0156433 A1 | 6/2009 | Mebratu et al. | |
| 2010/0206553 A1* | 8/2010 | Bailey | E21B 17/042 166/244.1 |
| 2010/0276152 A1 | 11/2010 | De Wolf et al. | |
| 2011/0286802 A1 | 11/2011 | Persson et al. | |
| 2012/0067576 A1 | 3/2012 | Reyes et al. | |
| 2012/0097392 A1* | 4/2012 | Reyes | C02F 5/12 166/279 |
| 2013/0269936 A1 | 10/2013 | Reyes et al. | |
| 2013/0269946 A1 | 10/2013 | Dziekonski | |
| 2013/0269947 A1 | 10/2013 | Shilling et al. | |
| 2013/0274155 A1 | 10/2013 | Nasr-el-din et al. | |
| 2016/0160621 A1* | 6/2016 | Collins | C09K 8/58 166/270.1 |

FOREIGN PATENT DOCUMENTS

WO     2015/088519 A2    6/2015
WO     2015/088587 A1    6/2015

OTHER PUBLICATIONS

Kalfayan, Leonard John. "Fracture acidizing: History, present state, and future." SPE Paper 106371, SPE Hydraulic Fracturing Technology Conference. Society of Petroleum Engineers, 2007.

(Continued)

*Primary Examiner* — Silvana C Runyan
(74) *Attorney, Agent, or Firm* — Craig Roddy; Baker Botts L.L.P.

(57) ABSTRACT

Compositions and methods for formulating acidizing treatment fluids comprising hydrofluoric acid are provided. In one embodiment, the method comprises: providing a treatment fluid comprising: an aqueous base fluid; at least one chelant; hydrofluoric acid; and at least one corrosion inhibitor; pumping the treatment fluid through a subsea riser system; and introducing the treatment fluid into a subterranean formation. In another embodiment, the method comprises: providing a treatment fluid comprising: an aqueous base; at least one chelant; hydrofluoric acid; and at least one corrosion inhibitor; and a boron-containing compound; and introducing the treatment fluid into a subterranean formation via a wellbore penetrating at least a portion of the subterranean formation.

12 Claims, 12 Drawing Sheets

(56) References Cited

OTHER PUBLICATIONS

Mainier, Fernando B., et al. "Evaluation of titanium in hydrochloric acid solutions containing corrosion inhibitors." IOSR Journal of Mechanical and Civil Engineering 10.1 (2013): 66-69.

Baxter, Carl F., Ronald W. Schutz, and Christopher S. Caldwell. "Experience and Guidance in the Use of Titanium Components in Steel Catenary Riser Systems." Offshore Technology Conference. Offshore Technology Conference, 2007. OTC-18624-MS.

International Search Report and Written Opinion issued in related PCT Application No. PCT/US2014/046848 dated Nov. 14, 2014, 13 pages.

International Search Report and Written Opinion issued in related PCT Application No. PCT/US2013/074440 dated Jul. 28, 2014, 13 pages.

Restrepo, Alejandro, et al. "Effective Kaolinite Damage Control Under Unfavorable Chemical Environment: Field Case." SPE Paper 151841, SPE International Symposium and Exhibition on Formation Damage Control. Society of Petroleum Engineers, 2012.

Jaramillo, Oscar Julian, et al. "Matrix Acid Systems for Formations With High Clay Content." SPE Paper 126719, SPE International Symposium and Exhibiton on Formation Damage Control. Society of Petroleum Engineers, 2010.

Rozo, Rafael Eduardo, et al. "An alternative solution to sandstone acidizing using a nonacid based fluid system with fines-migration control." SPE Paper 109911, SPE Annual Technical Conference and Exhibition. Society of Petroleum Engineers, 2007.

Tuedor, Francis E., et al. "A breakthrough fluid technology in stimulation of sandstone reservoirs." SPE Paper 98314, SPE International Symposium and Exhibition on Formation Damage Control. Society of Petroleum Engineers, 2006.

"Corrosion Resistant Alloys for Deep Offshore Drilling by High Density Infrared Fusion Process" found at pennwell.websds.net/2013/dot/papers/T1S4O2-paper.pdf.

Virtanen, S. (2012). Degradation of Titanium and Its Alloys. In Degradation of Implant Materials (pp. 29-55). Springer New York.

International Preliminary Report on Patentability issued in related Application No. PCT/US2014/046848, dated Jun. 23, 2016 (10 pages).

* cited by examiner

HYDROFLUORIC ACIDIZING COMPOSITIONS FOR SUBSEA RISER SYSTEMS AND MODULATING AGENT FOR HYDROFLUORIC ACIDIZING COMPOSITION

CROSS-REFERENCE TO RELATED APPLICATIONS

The present application is a U.S. National Stage Application of International Application No. PCT/US2014/046868 filed Jul. 16, 2014, which claims priority to and is a continuation-in-part of International (PCT) Application No. PCT/US2013/074440 which was filed on Dec. 11, 2013, and the entirety of which are incorporate herein by reference.

BACKGROUND

The present disclosure provides compositions and methods for acidizing treatment fluids comprising hydrofluoric acid.

Treatment fluids can be used in a variety of subterranean treatment operations. Such treatment operations can include, without limitation, drilling operations, stimulation operations, production operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

In acidizing operations, a subterranean formation containing an acid-soluble material can be treated with an acid to dissolve at least a portion of the material. Formation components of the formation matrix may comprise the acid-soluble material in some cases. In other cases, the acid-soluble material may have been deliberately introduced into the subterranean formation in conjunction with a stimulation operation (e.g., proppant particulates). Illustrative examples of formation components that may be dissolved by an acid include, for example, carbonates, silicates, and aluminosilicates. Dissolution of these formation components can desirably open voids and conductive flow pathways in the formation that can improve the formation's rate of hydrocarbon production, for example. In a similar motif, acidization may be used to remove like types of precipitation damage that can be present in the formation.

Carbonate formations contain minerals that comprise a carbonate anion (e.g., calcite). When acidizing a carbonate formation, the acidity of the treatment fluid alone can be sufficient to solubilize the formation components. Both mineral acids (e.g., hydrochloric acid) and organic acids (e.g., acetic and formic acids) can be used to treat a carbonate formation, often with similar degrees of success.

Siliceous formations can include minerals such as, for example, zeolites, clays, and feldspars. Most sandstone formations contain about 40% to about 98% sand quartz particles (i.e., silica), bonded together by various amounts of cementing material including carbonates (e.g., calcite), aluminosilicates, and other silicates. As used herein, the term "siliceous" refers to a substance having the characteristics of silica, including silicates and/or aluminosilicates.

Acidizing a siliceous formation (e.g., a sandstone formation or a clay-containing formation) may present more difficulties than acidizing a carbonate formation. Specifically, the treatment of a siliceous formation with the treatment fluids commonly used for acidizing a carbonate formation may have little effect because most mineral acids and organic acids do not effectively react with siliceous materials. In contrast to most mineral acids and organic acids, hydrofluoric acid (HF) can react readily with siliceous materials to produce soluble substances.

The use of HF, however, can be detrimental to certain types of equipment. In particular, HF is especially corrosive to sensitive metallurgic grades, such as titanium. As such, it is generally undesirable to expose titanium alloys to HF acidizing compositions.

BRIEF DESCRIPTION OF THE DRAWINGS

These drawings illustrate certain aspects of some of the embodiments of the present disclosure, and should not be used to limit or define the claims.

Figure 1:
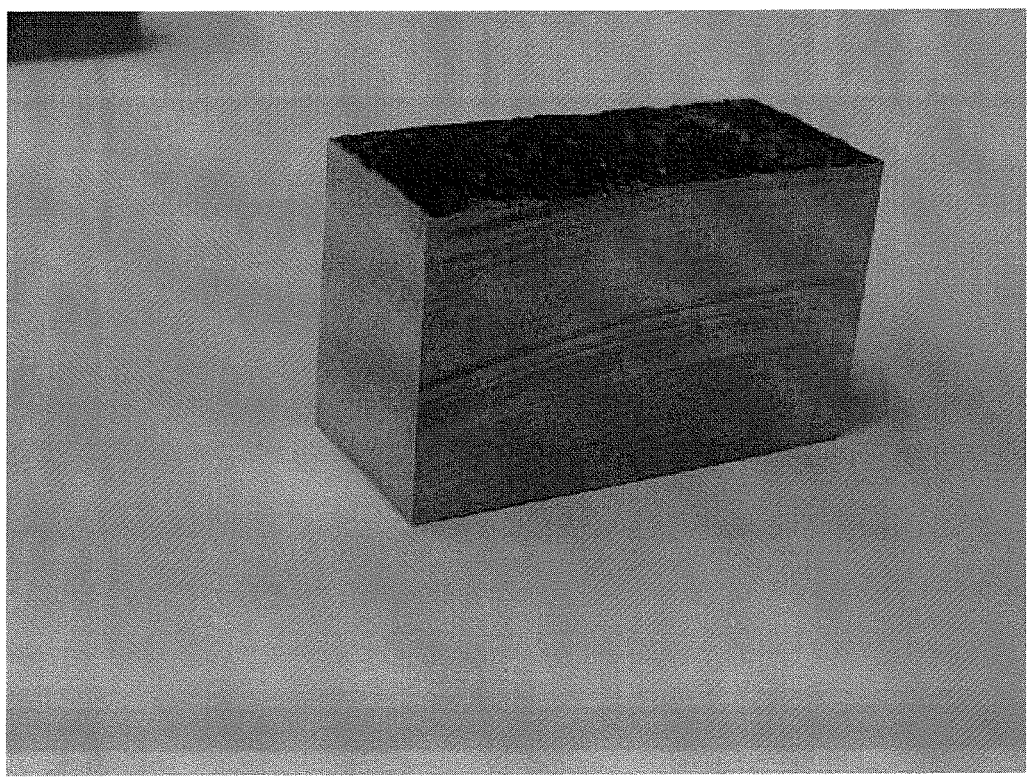
FIG. 1 is a photograph illustrating a titanium sample coupon prior to any treatment.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF EMBODIMENTS

The present disclosure provides compositions and methods for acidizing treatment fluids comprising hydrofluoric acid. More particularly, in certain embodiments, the present disclosure relates to compositions and methods for using acidizing treatment fluids comprising hydrofluoric acid in oilfield operations also using sensitive metallurgic grades. The examples described herein relate to hydrofluoric based compositions used with titanium alloys for illustrative purposes only. It is understood that the description herein can refer to any suitable acidizing compositions and use with any metallurgic grades. In particular, the systems and methods may be used wherever corrosion reduction is desirable. Embodiments may be utilized to provide corrosion resistance for any fluid used in oil well operations, e.g., acidizing fluids, fracturing fluids, drilling fluid, spacer fluid/flush, treatment fluids, settable fluids, production fluids, etc. However, embodiments described herein may be particularly useful in the context of reducing corrosion (or increasing the resistance to corrosion) for sensitive metallurgic grades such as titanium alloys and used during acidizing operations, specifically HF acidizing.

Embodiments of acidizing treatment fluids of the present disclosure may comprise: an aqueous base, one or more chelants, a hydrofluoric acid (HF) solution, and one or more corrosion inhibitors. In certain embodiments, the composition may further comprise boron, e.g., as a corrosion modulating agent.

Embodiments herein may include methods of use and compositions for a HF acidizing treatment fluid that can be used in subterranean formations having metallurgical elements including titanium alloys. Embodiments herein may also include methods of use and compositions for a HF acidizing treatment fluid that can be used in offshore applications involving a subsea riser system having metallurgical elements including titanium alloys.

Certain embodiments may comprise an acidic, chelant-based HF system used for acidizing stimulation treatments that can be effectively inhibited from corroding the surface of titanium alloys, with the aid of a corrosion inhibitor. In other embodiments, the fluid may also act to passivate the surface of titanium alloys against HF attack of said metal.

Generally, the base fluid of the acidizing treatment fluids of the present disclosure may comprise any aqueous fluid. In particular embodiments, the base fluid may comprise fresh water, salt water (e.g., water containing one or more salts dissolved therein), brine (e.g., saturated salt water), sea water, any combination thereof, or any derivative thereof. In other embodiments, the base fluid may comprise a liquid chelating agent or scale control agent by itself. Generally, the base fluid may be from any source, provided that it does not contain components that might adversely affect the stability and/or performance of the acidizing treatment fluids of the present disclosure.

Chelants that may be suitable for use in the acidizing treatment fluids of the present disclosure include chelants that are soluble in acid. In certain embodiments, the one or more chelants comprise methylglycine diacetic acid ("MGDA"). MGDA may be commercially available from BASF under the trade name TRILON® M. In certain embodiments, the one or more chelants comprise glutamic acid diacetic acid ("GLDA") or its sodium, potassium, ammonium salts, such chelant is commercially available from Akzo Nobel as Dissolvine StimWell HTF. Alternatively iminodisuccinic acid ("IDS") (sodium salts of N-(1, 2-dicarboxyethyl)-D,L-aspartic acid) may be used, which is commercially available from Lanxess as BAYPURE® CX100. Hydroxyiminodisuccinic acid ("HIDS") is another desirable chelant, and it is available from Nippon Shokubai.

Other chelants in the acidizing treatment fluids of the present disclosure may include (2-hydroxyethyl)ethylenediaminetriacetic acid ("HEDTA"), β-alanine diacetic acid ("β-ADA"), ethylenediaminedisuccinic acid, S,S-ethylenediaminedisuccinic acid ("EDDS"), polyamino disuccinic acids, N-bis[2-(1,2-dicarboxyethoxy)ethyl]glycine ("BCA 6"), N-bis[2-(1,2-dicarboxyethoxy)ethyl]aspartic acid ("BCA5"), N-bis[2-(1,2-dicarboxyethoxy)ethyl]methylglycine ("MCBA5"), N-tris[(1,2-dicarboxyethoxy)ethyl]amine ("TCA6"), N-methyliminodiacetic acid ("MIDA"), iminodiacetic acid ("IDA"), N-(2-acetamido)iminodiacetic acid ("ADA"), hydroxymethyl-iminodiacetic acid,2-(2-carboxyethylamino)succinic acid ("CEAA"), 2-(2-carboxymethylamino)succinic acid ("CMAA"), diethylenetriamine-N,N"-disuccinic acid, triethylenetetramine-N,N'''-disuccinicacid, 1,6-hexamethylenediamine-N,N'-disuccinic acid, tetraethylenepentamine-N,N''''-disuccinicacid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,Ndiacetic acid, cysteic acid-N-monoacetic acid, alanine-N-monoacetic acid, N-(3-hydroxysuccinyl)aspartic acid, N-[2-(3-hydroxysuccinyl)]-L-serine, aspartic acid-N,N-diacetic acid, aspartic acid-N-monoacetic acid, including any salt, derivative, or combination thereof.

The concentration and amounts of the chelants in the acidizing composition may vary. In certain embodiments of acidizing treatment fluids utilizing MGDA, the amount of MGDA-$Na_3$ may vary between approximately 1% to approximately 30% by weight of the treatment fluid. When used as MGDA-$Na_3$ (40% w/v), the amount may vary between approximately 1% to approximately 35%, more preferably between approximately 5% to approximately 30% (pH approximately 0.5 to approximately 4.5), and most preferably between approximately 8% to approximately 26% (pH approximately 1.5 to approximately 4). When used as MGDA-$Na_3$ particulate, the amount may vary between approximately 1% to approximately 50%, more preferably between approximately 5% to approximately 40% (pH approximately 0.5 to approximately 4.5), and most preferably between approximately 8% to approximately 26% (pH approximately 1.5 to approximately 4).

In certain embodiments of acidizing treatment fluids utilizing GLDA, the amount of GLDA, such as GLDA-$NaH_3$/GLDA-$Na_2H_2$/GLDA-$Na_3H$/GLDA-$Na_4$, may vary between approximately 1% to approximately 30%. In certain embodiments, preferred concentration ranges for GLDA-$Na_x$ (x=1, 2, 3, 4) (pH approximately 0.5 to approximately 4.5) may vary between approximately 5% to approximately 25%, more preferably between approximately 6% to approximately 20% (pH approximately 1.5 to approximately 4).

The acidizing treatment fluids of the present disclosure may also comprise hydrofluoric acid (HF). The HF concentration and amounts may vary in the acidizing treatment fluid. In certain embodiments of acidizing treatment fluids, the HF concentration may vary between approximately 0.1% to approximately 4% by weight of the treatment fluid, more preferably between approximately 0.5% to approximately 2.5%, and most preferably between approximately 0.8% and approximately 1.9%.

In some embodiments, the HF can be combined with another mineral acid such as, for example, hydrochloric acid. In some embodiments, the HF in a treatment fluid of the present disclosure may be generated through the use of a suitable HF generating compound. Examples of suitable HF generating compounds include, but are not limited to, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, boron trifluoride acetic acid complex, boron trifluoride phosphoric acid complex, boron trifluoride dihydrate, polyvinylammonium fluoride, polyvinylpyridinium fluoride, pyridinium fluoride, imidazolium fluoride, ammonium fluoride, ammonium bifluoride, tetrafluoroborate salts, hexafluoroantimonate salts, hexafluorophosphate salts, bifluoride salts, and any combination thereof.

The acidizing treatment fluid of the present disclosure may also include one or more corrosion inhibitors. The concentration and amounts of the one or more corrosion inhibitors may vary in the acidizing treatment fluid. In certain embodiments of the acidizing treatment fluid, the concentration of the corrosion inhibitors may vary between approximately 0.1% to approximately 5% by weight of the treatment fluid, more preferably between approximately 1% to approximately 3%, and most preferably between approximately 2% and approximately 4%. In some embodiments, no corrosion inhibitor activator or intensifier may be used.

In certain embodiments, the corrosion inhibitor may include sulfur-containing organic acids and/or amines, such as MSA-III™ (available from Halliburton Energy Services, Inc., Duncan, Okla.). Exemplary corrosion inhibitors for the acidic treatment fluid may include the following: an acetylenic alcohol; a Mannich condensation product; an unsaturated carbonyl compound; an unsaturated ether compound; formamide; a formate; an iodide; a terpene; an aromatic hydrocarbon; cinnamaldehyde; a cinnamaldehyde derivative; an acetylenic alcohol; a fluorinated surfactant; a quaternary derivative of heterocyclic nitrogen base; a quaternary derivative of a halomethylated aromatic compound; and combinations thereof. Ranges of amounts of corrosion inhibitor may vary and be dependent on the specific inhibitor type. For example, an exemplary amount of MSA-III™ may require a concentration of approximately 0.5% to approximately 1%, but higher concentrations could be used.

In certain embodiments, the acidic treatment fluid of the present disclosure may further comprise boron, for example, as a corrosion modulating agent, which may facilitate the exposure of titanium to high concentrations of HF at high temperatures or of non-corrosion resistant grades. In certain embodiments, the acidic treatment fluid of the present disclosure may comprise boric acid in a concentration between approximately 0.15% to approximately 25% by weight of the treatment fluid, more preferably between approximately 0.5% to approximately 10%, and most preferably between approximately 1% and approximately 7%. In certain embodiments, the concentration of HF may be 2.2% w/v or 1.1 M. In certain embodiments, the temperature may be 250° F. Lower HF concentrations, 0.1 to 1% w/v HF, may be easier to inhibit.

Without limiting the present disclosure to any particular theory or mechanism, titanium typically contains a titanium dioxide film, nanometers thick, which imparts many of the corrosion resistance properties of this metal. The presence of oxygen may drive oxidation of titanium zero valent and forms $TiO_2$, hence an oxidizing species or agent facilitates passivation of the titanium metal surface. In the context of oilfield acidization operations or treatments, oxygen may be found in the fluids introduced or injected into the reservoir through the piping or strings connecting the wellbore to the reservoir and the surface installation. However, the concentration of oxygen may not be high enough to passivate or repassivate a titanium surface that has been exposed to a $TiO_2$-dissolving species like HF. Hence an additional repassivation or passivation mode of the Ti(n+, n=1 to 4) surface should be operative, such as utilizing the anodic properties of an oxidizing species, either an acid itself or being an oxidizer under acidic conditions. The combination of boric acid and bifluoride or fluoride, in low pH, leads to the formation of tetrafluoroborate anion, or fluoroboric acid. While the boron trifluoride molecule is not specifically made in the treatment fluid, its generation via chemical intermediates could lead to the passivation or repassivation of the titanium surface.

A variety of boron-containing compounds may be suitable for acidizing treatment fluids of the present disclosure. This includes boric acid, boron tetrafluoride, trifluoroborates, borate bis(L)M (where L is one of oxalic, citric, glycolic, lactic, tartaric, malic, maleic, and a succinic and M is a group I ion), boronic acids of the form R—B(OH)$_2$, esters and boronic acid derivatives including functionalized acrylates, organotrifluoroborates of the form R—BF$_3$-M+ (where M is one of Li, Na, K, Rb, and Cs)).

In certain embodiments, the acidizing treatment fluids of the present disclosure may comprise an aqueous base fluid, one or more chelants, hydrofluoric acid (HF) solution, and one or more corrosion inhibitors. In illustrative embodiments, suitable chelants can comprise GLDA, any GLDA salt, or any GLDA derivative, or hydroxyl iminodisuccinic acid ("HIDS"), or iminodisuccinic acid ("IDS"). In other embodiments, suitable chelants including MGDA, any salt thereof, any derivative thereof, or any combination thereof, including combinations with GLDA, can be used in the treatment fluids. Likewise, any of the previously listed biodegradable chelating agents can also be used in conjunction with the acidizing treatment fluids of the present disclosure, such as HIDS or IDS.

Blends with concentrations of MGDA ranging from approximately 0.6 M (approximately 12% w/v of the free acid form of the chelant) and HF ranging from approximately 1.5% to approximately 3%, using varying amounts of a corrosion inhibitor, such as MSA-III™ corrosion inhibitor (MSA-III™ 2.0% (w/v) available from Halliburton Energy Services, Inc., Duncan, Okla.) may prevent or inhibit corrosion. In certain embodiments, the composition of a fluid that passes corrosion requirements up to 300° F. may include: approximately 12% to approximately 26% MGDA, approximately 1.5% HF, and approximately 1% MSA-III™ at pH 2. In certain embodiments, mixing may be performed on the surface, before pumping the fluid treatment blend into a wellbore. The various components of the treatment fluid may be mixed in any order. In certain embodiments, the components may be mixed in the following order: MGDA, HCl, ammonium bifluoride ("ABF"), surfactant, and corrosion inhibitor.

Certain embodiments of the present disclosure may further comprise other oxidizers. Fluorine containing oxidizers suitable for use in acidic treatment fluids of the present disclosure include, but are not limited to, fluorine and fluorine compounds such as tri-fluoromine oxide ($NF_3O$), tetrafluorohydrazine ($N_2F_4$), nitrogen trifluoride ($NF_3$), difluoromine ($HNF_2$), chlorodifluoromine ($ClNF_2$), chlorine trifluoride ($ClF_3$), chlorine pentafluoride ($ClF_5$), bromine pentafluoride ($BrF_5$), bromine trifluoride ($BrF_3$), perchloryl fluoride ($FClO_3$), fluoronitroform [$FC(NO_2)_3$], bis-fluoroxidifluoromethane ($CH_2(OF)_2$), oxitrifluorochloride ($OClF_3$), oxygen difluoride ($OF_2$), nitryl fluoride ($FNO_2$), fluorine, and mixtures thereof.

Optionally, salts, other pH additives, corrosion inhibitors, surface active agents, anti-sludging agents, mutual solvents, scale inhibitors, viscosifiers, gases, diverting/fluid loss agents, and the like may be included in the treatment fluids of the present disclosure. The treatment fluids of the present disclosure can be used in subterranean formations to prevent or remediate precipitation damage in the formation caused by the dissolution of formation cations, particularly in the presence of hydrofluoric acid. Likewise, the present treatment fluids can be used in treating pipes, tubing, and like vessels.

The treatment fluids of the present disclosure may also include one or more additional additives, such as components to modify the rheological properties (e.g., viscosity) of the treatment fluids, gel stabilizers, fluid loss control additives, particulates, acids, corrosion inhibitors, catalysts, clay stabilizers, biocides, friction reducers, surfactants, solubilizers, pH adjusting agents, bridging agents, dispersants, flocculants, foamers, gases, defoamers, $H_2S$ scavengers, $CO_2$ scavengers, oxygen scavengers, scale inhibitors, lubricants, viscosifiers, weighting agents, and the like. One of ordinary skill in the art, with the benefit of this disclosure, will be able to determine the appropriate type and amount of such additives for a particular application. For example, in some embodiments, it may be desired to foam a treatment fluid of the present disclosure using a gas, such as air, nitrogen, or carbon dioxide.

Certain embodiments may not be HCl-based as in standard HF treatments. In certain embodiments, the compositions may not have a low pH that can be found in other HCl/HF fluids. Certain embodiments may not need any corrosion inhibitor intensifier, and may only require corrosion inhibitor concentrations that are typical in common acidizing treatments.

Embodiments described herein may be useful with sensitive metallurgic grades that are typically incompatible with existing HF acidizing treatments. For example, it may be considered undesirable to utilize titanium alloys in combination with existing HF acidizing treatments that will destroy and/or corrode the metal. Using a composition including, for example, 0.6 M MGDA concentration in conjunction with HF according to the teachings of the present disclosure may unexpectedly mitigate or prevent corrosion of a titanium alloy.

Embodiments herein may provide a fluid that ameliorates the use of highly corrosive acidic fluids that otherwise contain, by necessity, corrosion inhibition packages. Certain embodiment may expand the available area of acidizing high temperature sandstones.

In certain embodiments, the acidizing treatment fluid, whose properties may include a pH>1 and a combination of HF with high concentration of chelant, such as MGDA or GLDA, may be used to stimulate formations such as geothermal wells where any other HF-containing fluid might be inappropriate. The treatment of geothermal reservoirs is a challenging task, due to the difficulty of removing silica and silicate mineral deposits that typically require a HF-containing fluid to dissolve the latter. Embodiments described herein may allow HF-containing fluids to be used on wells containing titanium alloys, such as geothermals, which has been previously unfeasible. Embodiments described herein may also be used for wells bottomhole static temperature in excess of approximately 300° F. Since the described fluid appears to have less corrosion than typical HF treatments, the applicable temperature range can be extended thus multiplying potential uses, opportunities, and revenues.

In other embodiments, the acidizing treatment fluid of the present disclosure may be introduced into an offshore hydrocarbon producing reservoir through a subsea riser system. For example, a well system for an offshore hydrocarbon producing reservoir may include a subsea riser system extending from a wellhead installation arranged at a sea floor. The subsea riser may extend, for example, to an offshore oil and gas platform located at the surface of the ocean. A wellbore may extend downward from the wellhead installation through various earth strata to the reservoir. The wellbore may be cased, but it may be an uncased wellbore, without departing from the scope of the disclosure. The subsea riser system may be located in more than 500 to 3,500 meters of sea water where the temperature can reach 4° C. While in certain embodiments the subsea riser system may connect the wellhead installation to an offshore oil and gas platform, it may be used for other purposes including, for example, connecting the wellhead installation to a ship or other marine vessel.

The subsea riser system may comprise a conduit for allowing treatment fluids, including the acidizing treatment fluid of the present disclosure, to flow from the offshore oil and gas platform (or ship or other marine vessel) at the surface of the ocean to the wellhead installation at the sea floor where the treatment fluid can then be circulated in the wellbore. The subsea riser may also provide a conduit for circulated fluids to be returned from the wellbore (via the wellhead installation) to the surface. The subsea riser may comprise one or more pipes, tubes, hoses, umbilicals, or other structures that allow for the passage of fluids. The subsea riser may also comprise fasteners, joints, valves, or other components to hold the subsea riser together and/or control the flow of fluids through the subsea riser. The subsea riser system may also include components to control the pressure in the system.

Treatment fluids are typically introduced into the subsea riser at the surface to be pumped to the wellhead installation. One or more pumps may be used to pump fluid through the subsea riser. The treatment fluids may be introduced into the subsea riser directly or they may be introduced indirectly through a mixing hopper or other tank. A different pump may be used to pump the treatment fluid through the subsea riser system than is used to pump the various components of the treatment fluid into the mixing hopper or other tank.

The HF acidizing composition should be effective in dissolving the expected formation (clays, silica fines, aluminosilicates, and other dissolvable minerals) and have no detrimental effects on the riser components. Conventional HF acidizing fluids typically cannot contact specific metallurgical components of a subsea riser system without corroding them, namely those metallurgical elements comprising titanium alloys. In contrast, in certain embodiments, the acidizing treatment fluid of the present disclosure can be used with the titanium components because it may not cause as much corrosion.

In some embodiments, the acidizing treatment fluids of the present disclosure may be used in treating a portion of a subterranean formation, for example, in acidizing treatments such as matrix acidizing or fracture acidizing. In certain embodiments, the acidizing treatment fluid may be introduced into a subterranean formation. In some embodiments, the treatment fluid may be introduced into a wellbore that penetrates a subterranean formation. In some embodiments, the treatment fluid may be introduced using a pump at the surface of the wellbore.

In some embodiments, the acidizing treatment fluid may be introduced at a pressure sufficient to cause at least a portion of the treatment fluid to penetrate at least a portion of the subterranean formation, and the treatment fluid may be allowed to interact with the subterranean formation so as to create one or more voids in the subterranean formation (for example, in acidizing treatments). Introduction of the treatment fluid may in some of these embodiments be carried out at or above a pressure sufficient to create or enhance one or more fractures within the subterranean formation (e.g., fracture acidizing). In other embodiments, introduction of the treatment fluid may be carried out at a pressure below that which would create or enhance one or more fractures within the subterranean formation (e.g., matrix acidizing).

EXAMPLES

To facilitate a better understanding of the present disclosure, the following examples of certain aspects of some embodiments are given. In no way should the following examples be read to limit or define the scope of the claims.

Example 1

Several experiments were performed to determine the effect of sample fluids prepared according to embodiments of the present disclosure on titanium. To prepare the sample fluids, distilled water was first poured into the sample container, followed by ammonium bifluoride which, upon the addition of HCl acid, makes HF in situ. After the solid ammonium bifluoride had completely dissolved, a liquid chelating agent was added. A known amount of 38% reagent grade HCl acid was slowly poured in, followed by any surfactants and/or clay control additives. This same general process was used to prepare the sample fluids for each of the tests, although the specific amount of each reagent varied as described below.

The sample fluids were tested with a commercially obtained material (Ti-5) and an actual sample from a casing employed in a well. FIG. 1 is a photograph showing a titanium sample coupon prior to any treatment. The well casing sample was a typical casing tubing having metallurgy similar to the commercially obtained material and having other characteristics specific to a high temperature well. Ti alloy was a commercial grade material employed in typical surface casing completions. The titanium alloy was a Ti 6Al-4V alloy (Grade 5, Ti-5). Coupon specimens were cleaned, weighed, and immersed in 100 mL of the sample treatment fluids including water and an acidizing compositions (indicated for each sample in Tables 1-3). The coupon specimens immersed in treatment fluid were pressurized to 1000 psi and then heated to the test temperature indicated in Tables 1-3 below for the contact time indicated. After the contact time elapsed, any residues were cleaned from the specimens and the coupons were weighed again to determine the amount of corrosion loss by subtracting the final weight of the specimen from its initial weight before the test. The results are reported in Tables 1-3 below.

Figure 2:
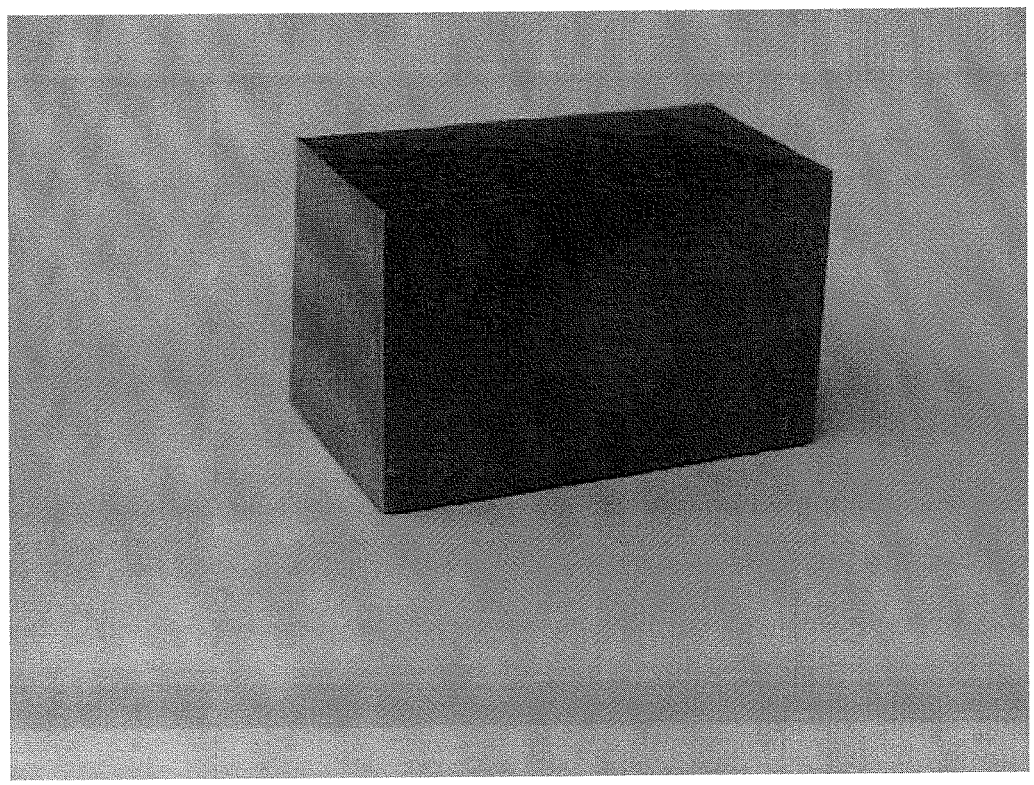
FIG. 2 is a photograph illustrating a titanium sample coupon after exposure to a 12.5% chelant solution with a pH of 2.

Table 1 describes the results of the first test, which evaluated the effect of the chelant itself (in the absence of HF) on the titanium casing sample. Accordingly, the sample fluid was prepared according to the protocol above, but the step of adding ammonium bifluoride was omitted so that HF was not formed. The sample fluid contained (a) 0.6 M MGDA-Na$_3$ (12.5% chelant or 16% w/v of trisodium salt) as the chelant, (b) 0.1% alkylphenol-formaldehyde resin as a surfactant, and (c) MSA-III™ corrosion inhibitor in the percentages listed in Table 1. The pH was adjusted to 2.0 using HCl. FIG. 2 is a photograph showing a titanium sample after exposure to the 12.5% chelant solution with a pH of 2.

TABLE 1

| 12.5% Chelant, pH 2.0 | | | | |
|---|---|---|---|---|
| Temperature (° F.) | Alloy | Time (h) | MSA-III (w/v) | Corrosion Loss (lbs/ft$^2$) |
| 300 | Ti | 6 | None | 0.003 |
| 375 | Ti | 6 | 0.2% | 0.022 |
| 375 | Ti | 12 | 0.8% | 0.015 |

Figure 3:
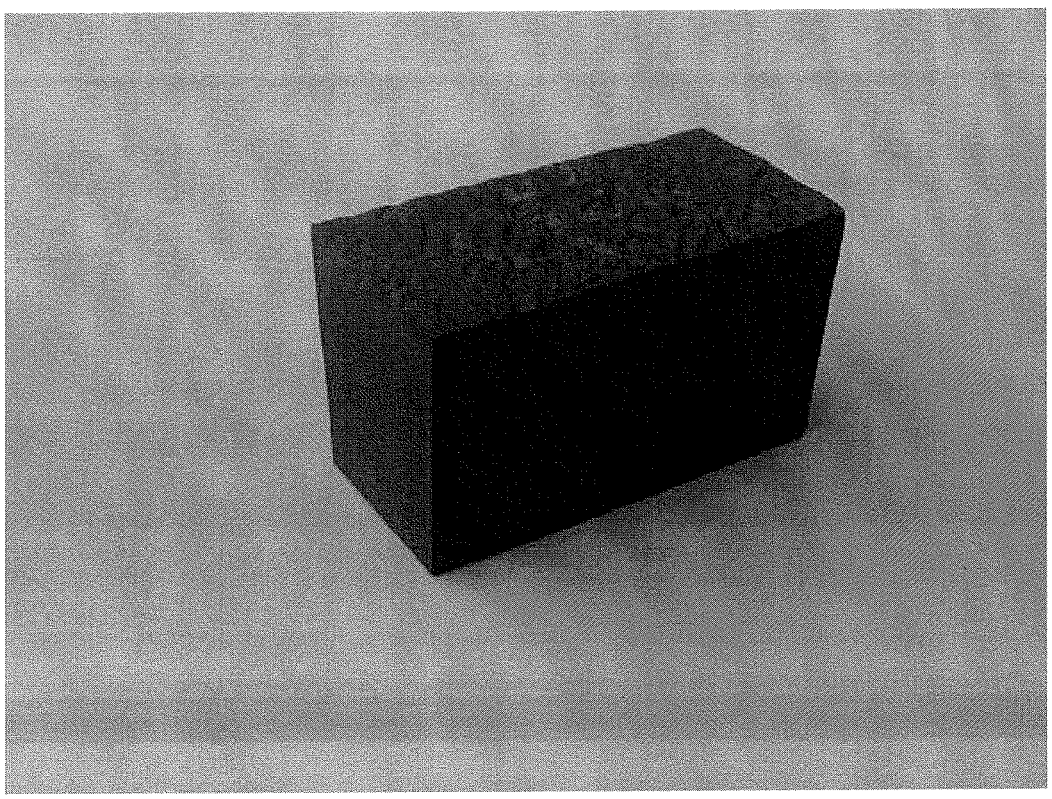
FIG. 3 is a photograph illustrating a titanium sample coupon after exposure to a 12.5% chelant solution containing 1.5% HF and 1% corrosion inhibitor (sulfur-containing carboxylic acid) with a pH of 2 at 200° F.
Figure 4:
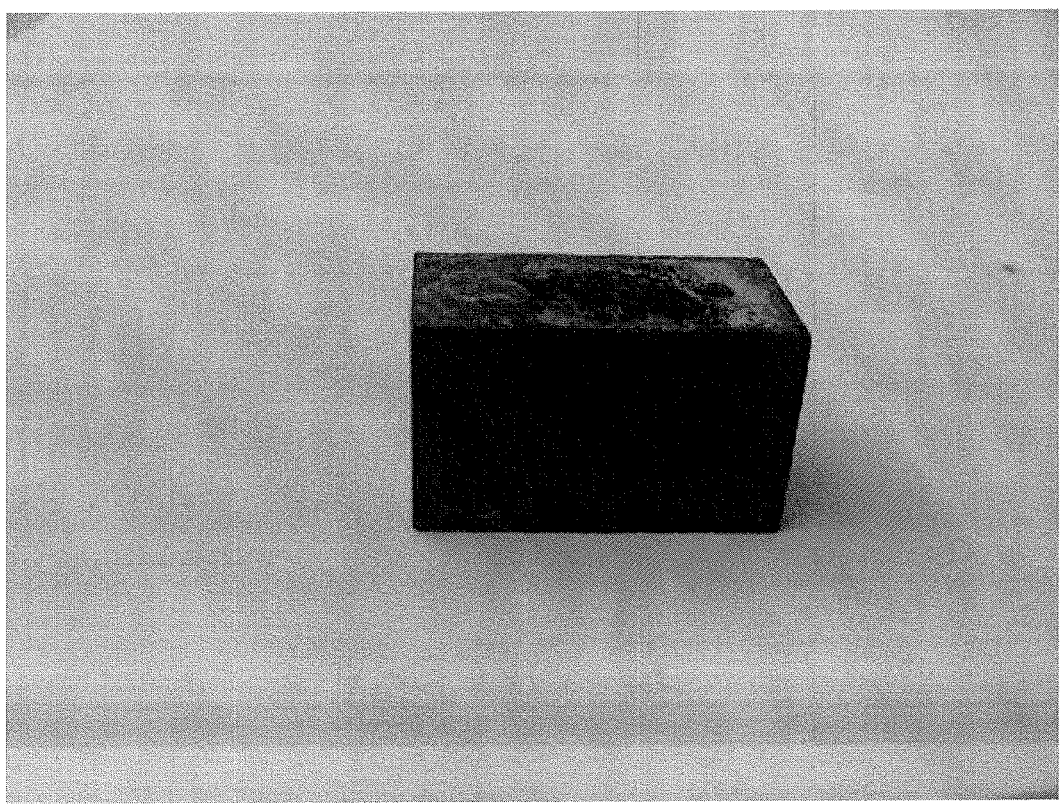
FIG. 4 is a photograph illustrating a titanium sample coupon after the sequential exposure to (1) uninhibited 12.5% chelant solution containing 1.5% HF with a pH of 2 and then (2) 12.5% chelant solution containing 1.5% HF and 1% corrosion inhibitor (sulfur-containing carboxylic acid) with a pH of 2 at 300° F.

Table 2 describes the results of the second test, which evaluated the effect of the chelant and HF on the titanium casing sample. The sample fluid was prepared according to the protocol above to produce a composition with 1.5% HF. The sample fluid also contained (a) 0.6 M MGDA-Na$_3$ (12.5% chelant or 16% w/v of trisodium salt) as the chelant and (b) MSA-III™ corrosion inhibitor in the percentages listed in Table 2. The pH was adjusted to 2.0 using HCl. FIG. 3 is a photograph showing a titanium sample after exposure to the 12.5% chelant solution containing 1.5% HF and 1% corrosion inhibitor (sulfur-containing carboxylic acid) with a pH of 2 at 200° F. FIG. 4 is a photograph showing a titanium sample after the sequential exposure to (1) uninhibited 12.5% chelant solution containing 1.5% HF with a pH of 2 and then (2) 12.5% chelant solution containing 1.5% HF and 1% corrosion inhibitor (sulfur-containing carboxylic acid) with a pH of 2 at 300° F.

TABLE 2

| 12.5% Chelant, pH 2.0, 1.5% HF Acid | | | | |
|---|---|---|---|---|
| Temperature (° F.) | Alloy | Time (h) | MSA-III (w/v) | Corrosion Loss (lb/ft$^2$) |
| 200 | Ti | 6 | None | 0.163 |
| 200 | Ti | 6 | 1% | No weight loss detected |
| 300 | Ti* | 3 | 1% | 0.02 |

*Reused coupon, previously acidized at 200° F. for 6 h.

Figure 5:
FIG. 5 is a photograph illustrating the remains of a titanium sample coupon after exposure to a 0.6% chelant solution containing 1.7% HF, 3% CLA-WEB™, and 0.6% corrosion inhibitor (sulfur-containing carboxylic acid) at a pH of 2.

Table 3 describes the results of the third test, which evaluated the effect of the chelant and the HF on the titanium casing sample at higher temperatures. The sample fluid was prepared according to the protocol above to produce a composition with 1.7% HF. The sample fluid also contained (a) MGDA-Na$_3$ as the chelant in the percentages listed in Table 3, (b) MSA-III™ corrosion inhibitor in the percentages listed in Table 3, and (c) 3% CLA-WEB™ (non-ionic surfactant commercially available from WellChem Technologies, an Ecolab Company) as a clay control additive. The pH was adjusted to 2.0 using HCl. FIG. 5 is a photograph showing the remains of a titanium sample after exposure to 0.6% chelant solution containing 1.7% HF, 3% CLA-WEB™, and 0.6% corrosion inhibitor (sulfur-containing carboxylic acid) at a pH of 2.

TABLE 3

1.7% HF at pH 2 (with Variable Amount of Chelant)

| Temperature (° F.) | Alloy | Time (h) | Chelant (%) | MSA-III (w/v) | Corrosion Loss (lbs/ft$^2$) |
|---|---|---|---|---|---|
| 375 | Ti | 6 | 0.60 | 0.6% | Coupon completely dissolved |
| 375 | Ti | 6 | 0.60 | 1.8% | Coupon completely dissolved |
| 375 | Ti | 6 | 12.50 | 0.6% | 0.757 |

The data above demonstrate the significant effect of the chelant on the corrosion of the titanium coupon by the sample fluid. Table 1 establishes that the chelant itself has minimal corrosive effect on the titanium coupon. When HF was introduced in the sample fluid, it was expected that the titanium coupon would be completely dissolved. However, the data in Table 2 showed that the chelant was able to reduce much of the corrosion and prevent the titanium coupon from dissolving completely. Table 3 further illustrates the surprising contrast between solutions with different amounts of chelant. When only 0.6% chelant was used, the titanium coupon completely dissolved regardless of whether the sample solution had 0.6% or 1.8% corrosion inhibitor. In contrast, the sample fluid with 12.5% chelant resulted in a corrosion loss of only 0.757 lbs/ft$^2$ despite having only 0.6% corrosion inhibitor.

Example 2

A second series of experiments were performed to evaluate the effectiveness of fluids prepared according to embodiments of the present disclosure on titanium. The optimum temperature range of treatment is 300° F. or less. The sample fluids were prepared according to the same process described in Example 1 above. In addition to the chemical components identified in Example 1, HAI-OS is an acetylenic-based corrosion inhibitor and HII-124B is an inorganic salt intensifier.

Coupon specimens were made of commercially obtained material (Coupons 1-6 in Table 4) and an actual sample from a casing employed in a well (Specimens 6 and 8-9 in Table 5). The commercially obtained titanium alloy was a Ti 6Al-4V, Grade 5 alloy. The sample casing is a typical casing tubing having metallurgy similar to the commercially obtained material and having other characteristics specific to a high temperature well. The titanium alloys were cleaned, weighed, and immersed in 100 mL of the treatment fluids including water and an acidizing compositions. The coupon specimens immersed in treatment fluid were pressurized to 1000 psi and then heated to the test temperature indicated for a set contact time. After the contact time elapsed, any residues were cleaned from the specimens and the coupons were weighed again to determine the amount of corrosion loss by subtracting the final weight of the specimen from its initial weight before the test.

Figure 6:
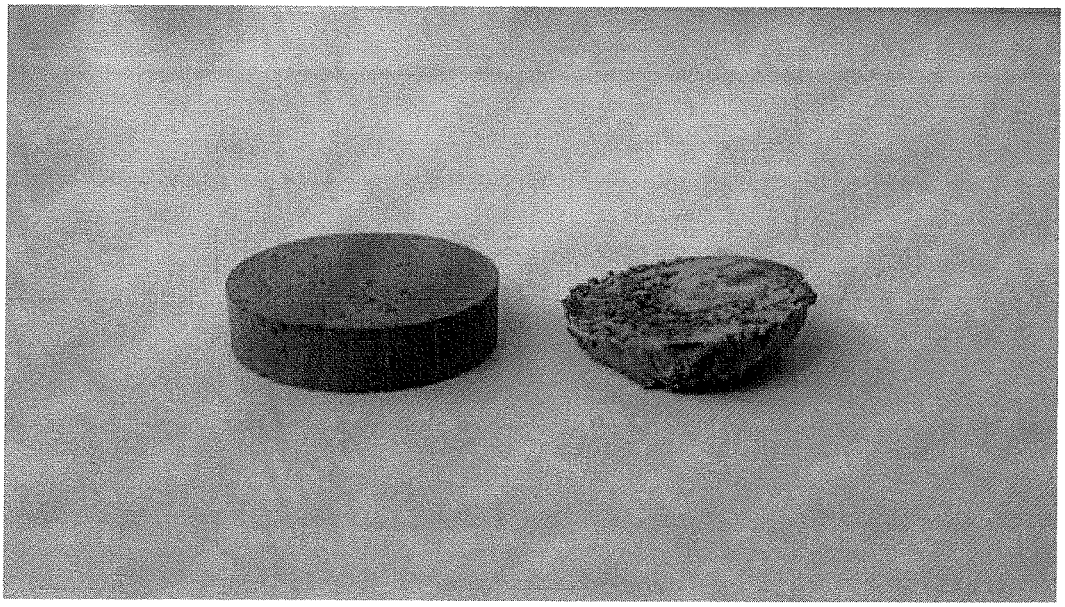
FIG. 6 is a photograph illustrating titanium sample coupons after treatment with MGDA-$Na_3$:0.6M MGDA-$Na_3$, 1.6% ABF, 3% CLA-WEB™, pH 3.5 (left) and 13.5% HCl, 1.5% HF (right), both at 300° F. for 4 hrs.

Table 4 describes the compositions of the sample fluids and the testing results for the commercial titanium samples. FIG. 6 is an image of titanium coupons after treatment with MGDA-Na$_3$:0.6M MGDA-Na$_3$, 1.6% ABF, 3% CLA-WEB™, pH 3.5 (left) and 13.5% HCl, 1.5% HF (right), both at 300° F. for 4 hrs.

TABLE 4

Corrosion Mass Loss of Titanium-5 (Ti-6Al4V)

| Metallurgy (Titanium) | Temp (° F.) | Time (hours) | Chelant (M) | [HF] (%) | pH | HAI-OS (%) | MSA-III (%) | HII-124B (%) | Cla-Web | Corrosion Loss (lbs/ft$^2$) |
|---|---|---|---|---|---|---|---|---|---|---|
| Coupon 1 | 300 | 4 | 0 | 1.5 | *** | 4 | | 0.5 | | 0.57 |
| Coupon 2 | 300 | 4 | 0.6 | 1.10 | 3.5 | 4 | | 0.5 | 3% | 0.007 |
| Coupon 3 | 300 | 4 | 0.3 | 1.10 | 4 | | 1 | | | 0.019 |
| Coupon 4 | 300 | 4 | 0.6 | 0.84 | 3.6 | | 1 | | | 0.001 |
| Coupon 5 | 300 | 4 | 0.5 | 1.96 | 3.1 | | 1 | | | 0.042 |
| Coupon 6 | 250 | 4 | 0.6 | 1.10 | 2.5 | 4 | | | | 0.007 |

*** 13.5% HCl

Table 5 describes the compositions of the sample fluids and the testing results for the titanium casing samples. Specimens 1-5 and 7 were previously tested and described in Example 1 above.

TABLE 5

Corrosion Mass Loss of Titanium Casing

| Metallurgy (Titanium) | Temp (° F.) | Time (h) | Chelant (M) | [HF] (%) | pH | MSA-III (%) | HII-124B (%) | Corrosion Loss (lbs/ft$^2$) |
|---|---|---|---|---|---|---|---|---|
| Specimen 1 | 375 | 6 | 0.6 | — | 2 | 0.20 | | 0.022 |
| Specimen 2 | 375 | 12 | 0.6 | — | 2 | 0.80% | | 0.015 |
| Specimen 3 | 375 | 6 | 0.01 | 1.70 | 1.9 | 0.60 | 3 | 0.757 |
| Specimen 4 | 375 | 6 | 0.01 | 1.70 | 1.9 | 0.60 | 3 | unable to weigh |
| Specimen 5 | 375 | 6 | 0.01 | 1.70 | 1.9 | 1.80 | 3 | unable to weigh |
| Specimen 6 | 300 | 3 | 0.6 | 1.50 | 2 | 1% | | 0.02 |
| Specimen 7 | 200 | 6 | 0.6 | 1.5 | 2 | 1 | | 0 |
| Specimen 8 | 300 | 6 | 0.3 | 1.96 | 3 | 2.5 | | 0.013 |
| Specimen 9 | 300 | 6 | 0.3 | 1.96 | 3 | 2.5 | | 0.012 |

Example 3

A third series of experiments were performed to evaluate the effect of organic-based corrosion inhibitors on fluids prepared according to embodiments of the present disclosure. The sample fluid were prepared using 2.2% w/v HF (generated in situ with ammonium bifluoride), 0.6 M MGDA-Na$_3$ (obtained from BASF in 40% concentrate supplied as Trilon M), a bis-quaternary ammonium compound (obtained from Wellchem (formerly Corsitech) and commercialized by Halliburton as CLA-WEB™) in 3% w/v, and the fluid pH adjusted to a nominal value of pH 2.8 with HCl. The base sample fluid was designated SH-1 for this series of tests.

Different corrosion inhibitors were tested, including an aldehydic-type (HAI-404M) and an acetylenic-type (HAI-OS). For comparison, randomly selected commercially available corrosion inhibitors were also tested. These were designated CI-1 and CI-2. The corrosion inhibitor was included into the fluid above before the final volume was volumetrically adjusted to 1000 mL in the corresponding concentration listed in Table 6 below.

The sample fluids were then exposed to a CP Ti-1 rectangular substrate 2×3-inches and 0.145 inches thick and the results are shown in Table 6. The data demonstrate that the use of aldehydic-type (HAI-404M) and acetylenic-type (HAI-OS) is an effective method to protect CP Ti-1 alloy. The pitting observed was highly diffused for the case of Test 4 and 5, while that in the control (Test 1) displayed highly localized, deep, pitting, the corrosion mass loss was still below the 0.05 lb/ft$^2$. The commercially available corrosion inhibitors (CI-1 and CI-2) showed no corrosion inhibition for the same fluid.

TABLE 6

Corrosion Mass Loss of Titanium-1 (commercially pure)

| Test | Composition | Metal-lurgy | Time (hr) | Before (g) | After (g) | Corrosion Loss (lb/ft$^2$) |
|---|---|---|---|---|---|---|
| 1 | SH-1 (no inhibitor) | CP Ti-1 | 6 | 24.2066 | 23.3517 | 0.042 |
| 2 | SH-1 + 5% CI-1 | CP Ti-1 | 6 | 24.3289 | 20.8464 | 0.171 |
| 3 | SH-1 + 5% CI-2 | CP Ti-1 | 6 | 24.4301 | 21.6045 | 0.138 |
| 4 | SH-1 + 5% HAI-404M | CP Ti-1 | 6 | 24.3028 | 24.2465 | 0.003 |
| 5 | SH-1 + 5% HAI-OS | CP Ti-1 | 6 | 24.4870 | 24.4669 | 0.001 |

Figure 7:
FIG. 7 is a photograph illustrating a titanium sample coupon after exposure to a 2.8 pH sample fluid containing (1) 2.2% w/v HF, (2) 0.6 M MGDA-$Na_3$, and (3) 3% w/v CLA-WEB™.
Figure 8:
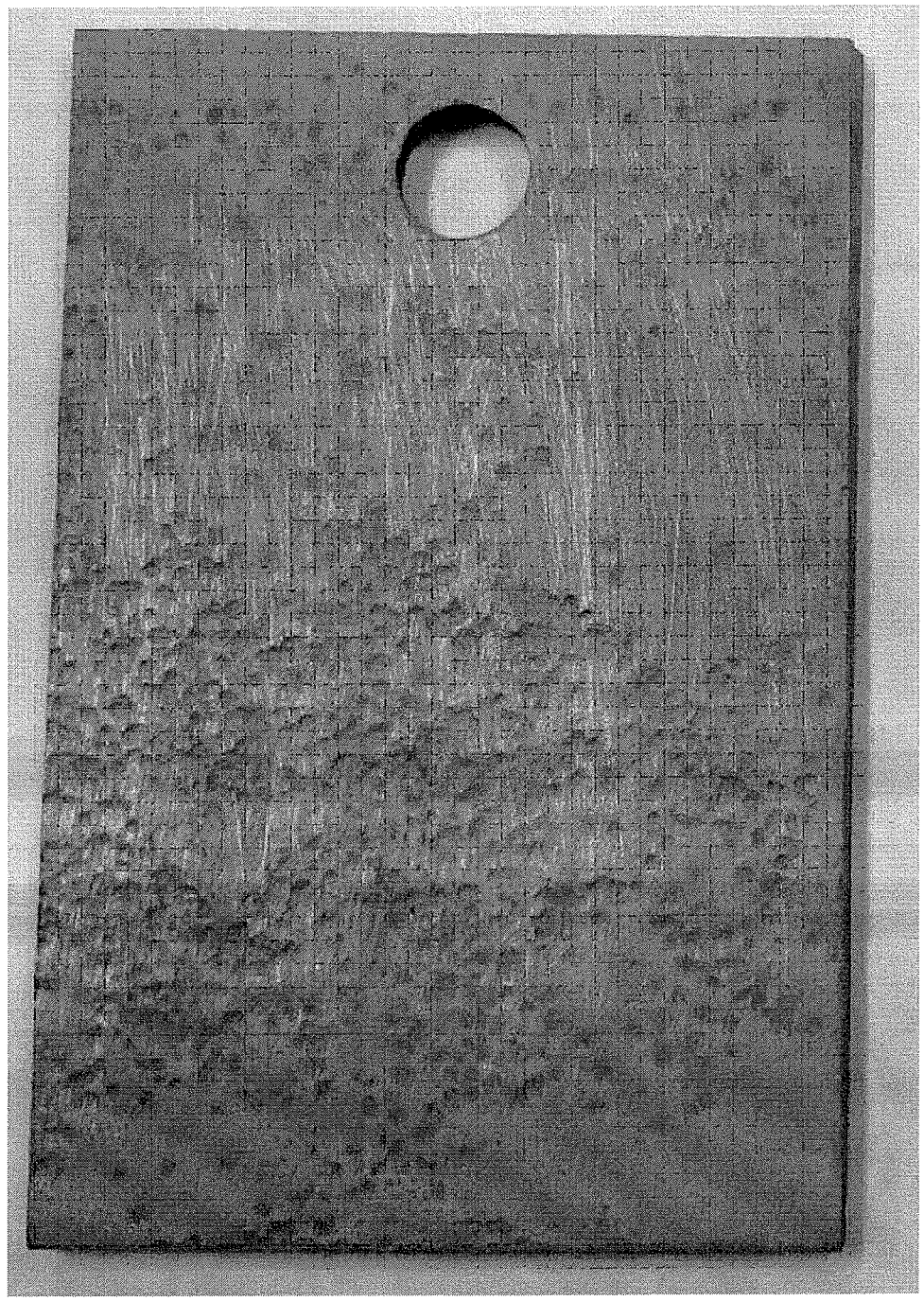
FIG. 8 is a photograph illustrating a titanium sample coupon after exposure to a 2.8 pH sample fluid containing (1) 2.2% w/v HF, (2) 0.6 M MGDA-$Na_3$, (3) 3% w/v CLA-WEB™, and (4) 5% w/v CI-1.
Figure 9:
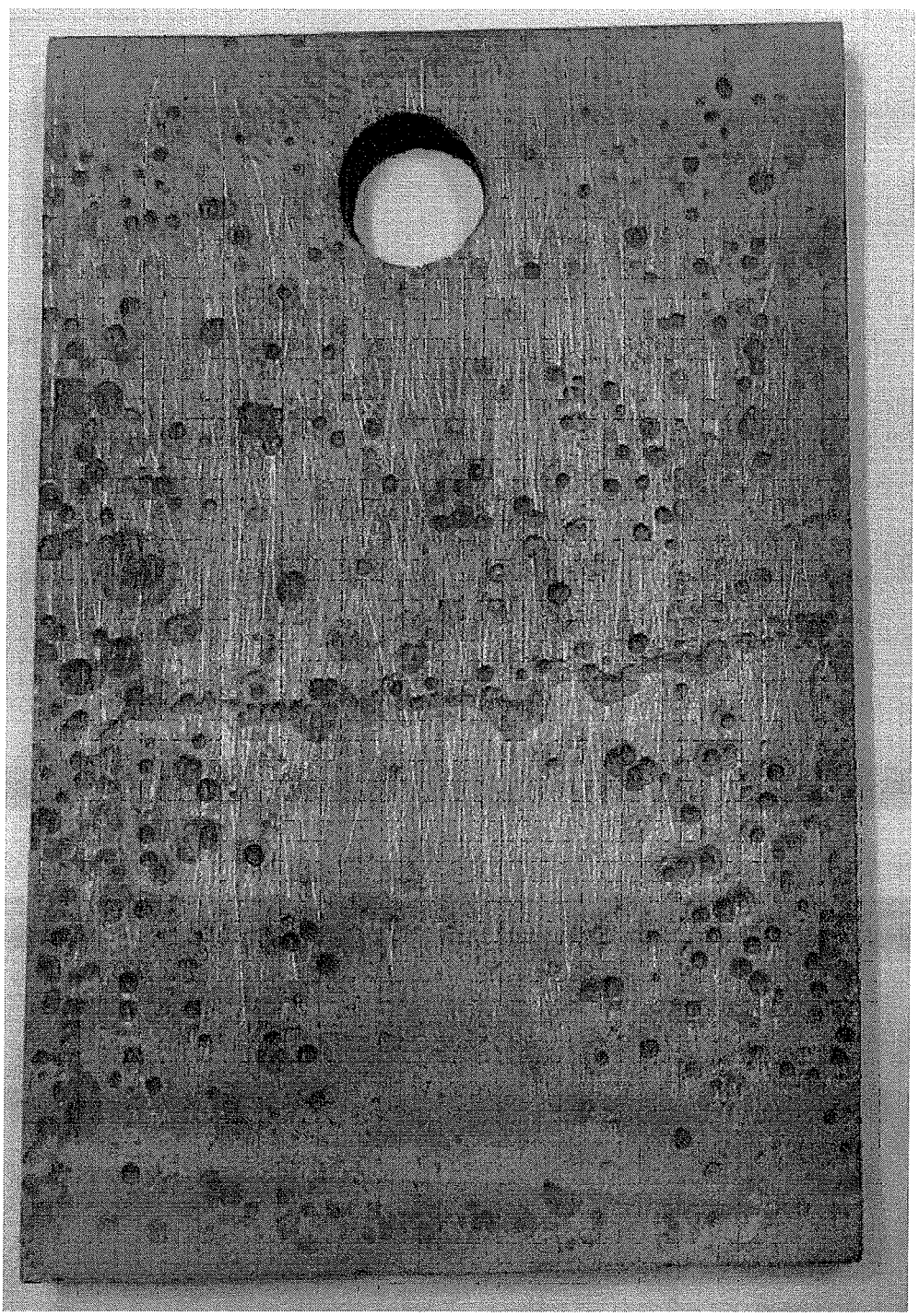
FIG. 9 is a photograph illustrating a titanium sample coupon after exposure to a 2.8 pH sample fluid containing (1) 2.2% w/v HF, (2) 0.6 M MGDA-$Na_3$, (3) 3% w/v CLA-WEB™, and (4) 5% w/v CI-2.
Figure 10:
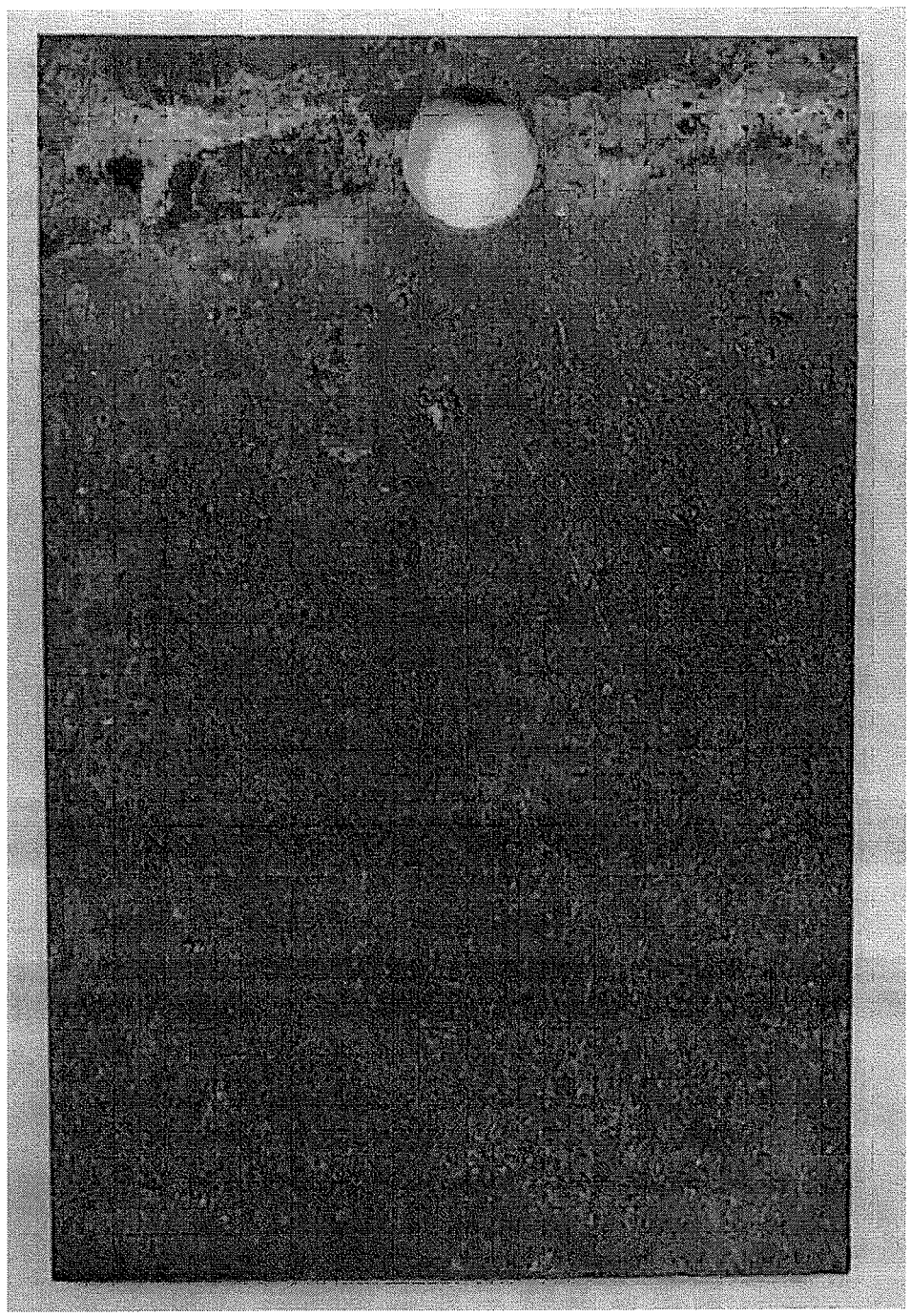
FIG. 10 is a photograph illustrating a titanium sample coupon after exposure to a 2.8 pH sample fluid containing (1) 2.2% w/v HF, (2) 0.6 M MGDA-$Na_3$, (3) 3% w/v CLA-WEB™, and (4) 5% w/v HAI-404M.
Figure 11:
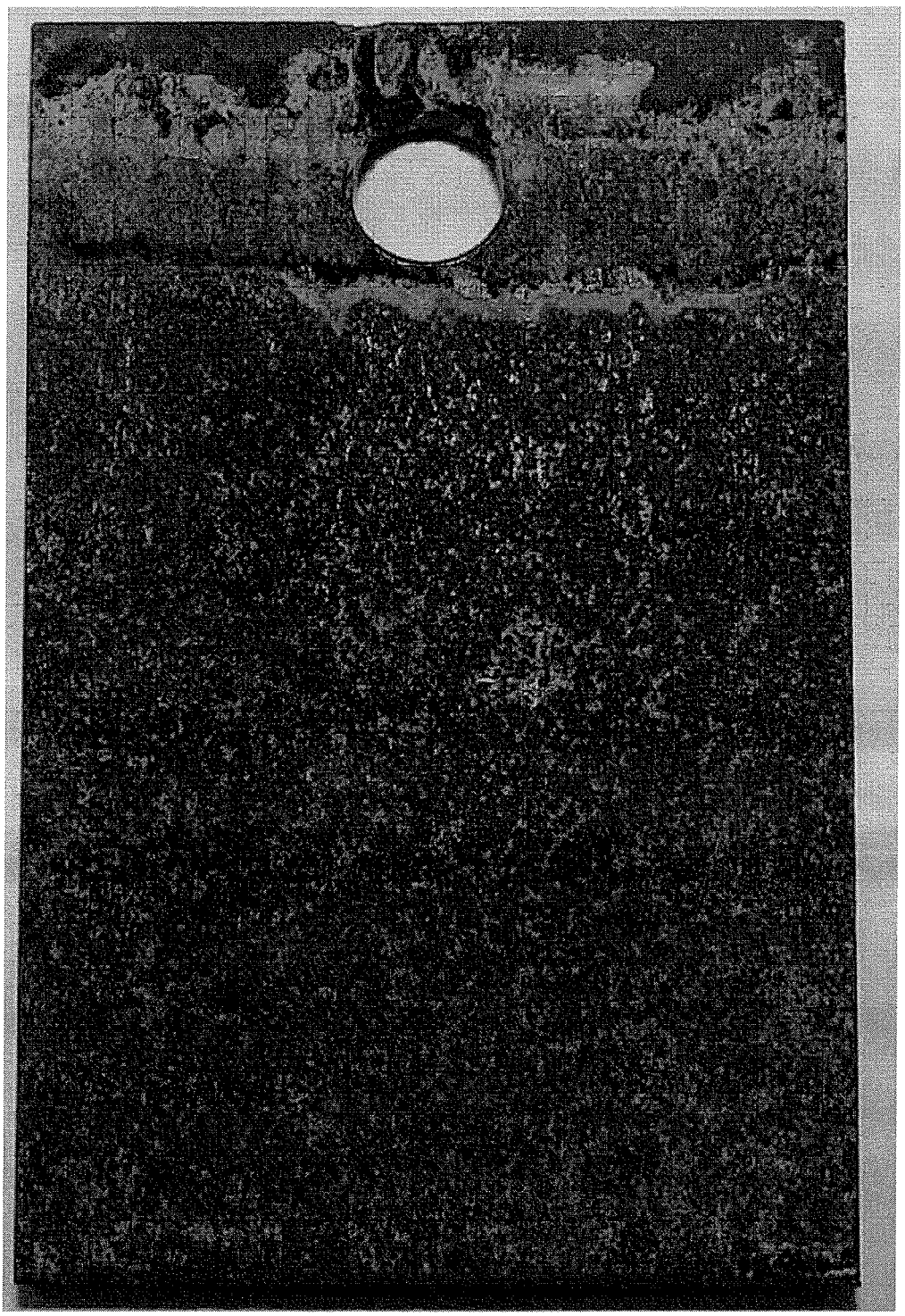
FIG. 11 is a photograph illustrating a titanium sample coupon after exposure to a 2.8 pH sample fluid containing (1) 2.2% w/v HF, (2) 0.6 M MGDA-$Na_3$, (3) 3% w/v CLA-WEB™, and (4) 5% w/v HAI-OS.

FIG. 7 illustrates the results of Test 1. FIG. 8 illustrates the results of Test 2. FIG. 9 illustrates the results of Test 3. FIG. 10 illustrates the results of Test 4. FIG. 11 illustrates the results of Test 5.

Example 4

A fourth series of experiments were performed to evaluate the effect of boron-containing compounds on fluids prepared according to embodiments of the present disclosure. Two treatment solutions were tested. The first (identified in Table 7 as SSB) consisted of 0.6 M MGDA, 2.8% w/v ammonium bifluoride, 5% CLA-WEB™, and boric acid (0.16 M) at a pH of 2.5. The second (identified in Table 7 as SSB2) consisted of 0.6 M MGDA, 4% w/v ammonium bifluoride, 5% CLA-WEB™, and boric acid (0.16 M) at a pH of 2.1. These sample fluids were prepared in according to the same protocol described in Example 1.

Figure 12:
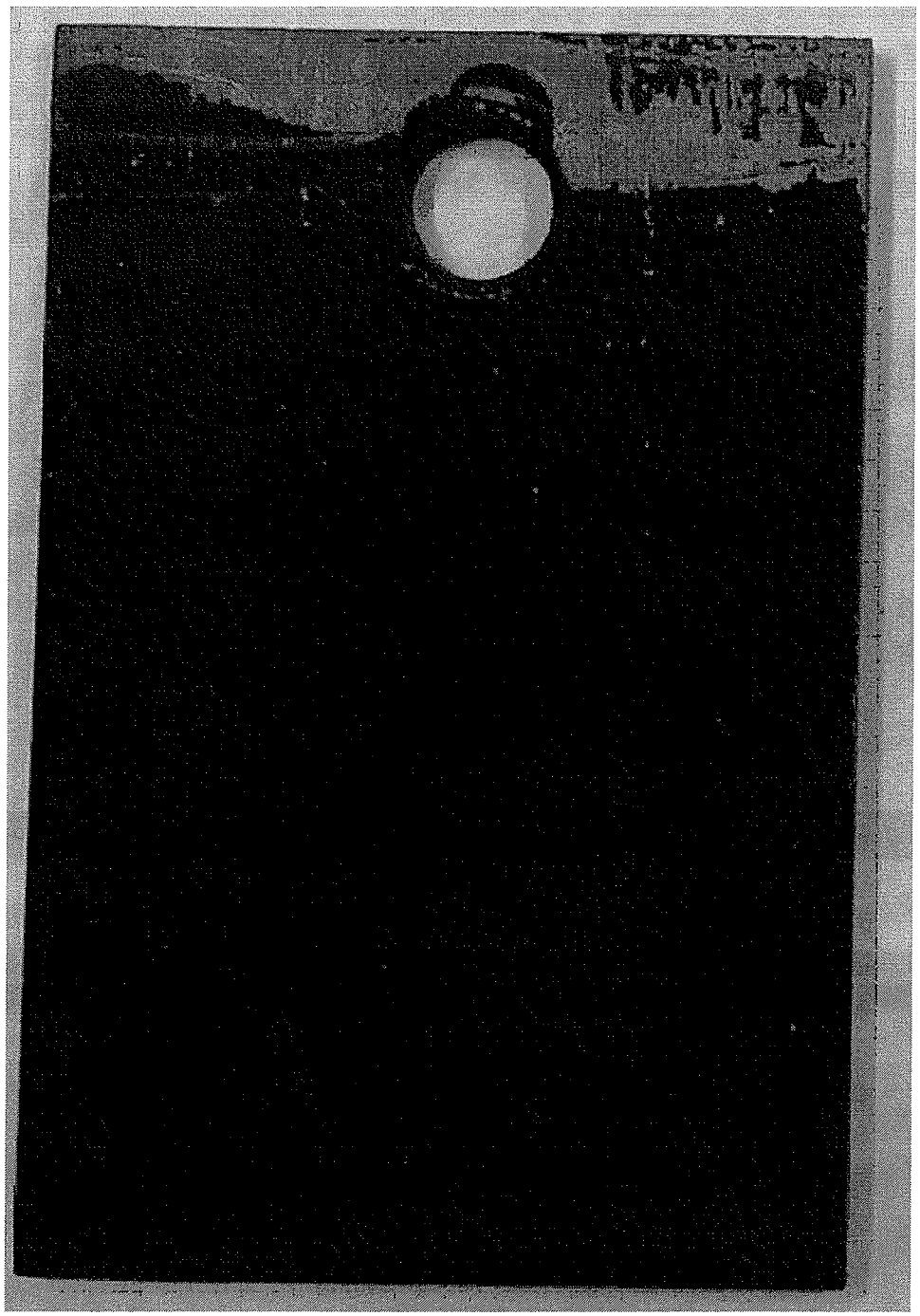
FIG. 12 is a photograph illustrating a titanium sample coupon after exposure to a 2.5 pH sample fluid containing (1) 2.8% w/v ammonium bifluoride, (2) 0.6 M MGDA-$Na_3$, (3) 5% w/v CLA-WEB™, and (4) 0.16 M boric acid.

The sample fluids were exposed to a CP Ti-1 rectangular substrate 2×3-inches and 0.145 inches thick. The first sample fluid did not include corrosion inhibitor of any type. Corrosion rate (in lb/ft$^2$) less than the industry accepted standard of 0.05 lb/ft2 was obtained using 0.16 M boric acid instead of an organic corrosion inhibitor, for a period of 6 h at 140° F. The titanium specimen suffered no visual pitting (see FIG. 12); the corrosion mass loss was still below the 0.031 lb/ft$^2$. The single observation was darkening of the CP Ti-1 specimen.

TABLE 7

Sample Fluids Containing Boron

| Composition | Metal-lurgy | Time (hr) | Before (g) | After (g) | Corrosion Loss (lb/ft$^2$) |
|---|---|---|---|---|---|
| SSB | Ti Gr I | 6 | 24.5269 | 23.8902 | 0.031 |
| SSB + 2% HAI-404M | Ti Gr I | 6 | 24.4305 | 23.8620 | 0.028 |
| SSB + 2% HAI-OS | Ti Gr I | 6 | 24.1077 | 23.5080 | 0.029 |
| SSB2 + 3% MSA-III | Ti Gr I | 6 | 24.5087 | 23.0231 | 0.073 |
| SSB2 + 2% HAI-OS + 1% MSA-III | Ti Gr I | 6 | 24.9184 | 23.2526 | 0.082 |
| SSB2 + 0.1% Asperse + 5% MSA-III | Ti Gr I | 6 | 24.9749 | 23.5058 | 0.072 |

An embodiment of the present disclosure is a method comprising: providing a treatment fluid comprising: an aqueous base fluid; at least one chelant; hydrofluoric acid; and at least one corrosion inhibitor; pumping the treatment fluid through a subsea riser system; and introducing the treatment fluid into a subterranean formation. Optionally, the chelant comprises a chelant selected from the group consisting of: methylglycine diacetic acid, glutamic acid diacetic acid, hydroxyl iminodisuccinic acid, iminodisuccinic acid, hydroxyethylene diaminetetraacetic acid, and any combination thereof. Optionally, the hydrofluoric acid is present from about 0.4% to about 4% by weight of the treatment fluid. Optionally, the corrosion inhibitor comprises a corrosion inhibitor selected from the group consisting of: an acetylenic alcohol, a Mannich condensation product, an unsaturated carbonyl compound, an unsaturated ether compound, a formamide, a formate, a carbonyl compound, a terpene, an aromatic hydrocarbon, cinnamaldehyde, a cinnamaldehyde derivative, a fluorinated surfactant, a quaternary derivative of heterocyclic nitrogen base, a quaternary derivative of a halomethylated aromatic compound, and any combination thereof. Optionally, the hydrofluoric acid is generated using a hydrofluoric acid generating compound. Optionally, the subsea riser system comprises titanium. Optionally, the treatment fluid is injected into the subterranean formation using a pump.

Another embodiment of the present disclosure is a method comprising: providing a treatment fluid comprising: an aqueous base; at least one chelant; hydrofluoric acid; and at least one corrosion inhibitor; and a boron-containing compound; and introducing the treatment fluid into a subterranean formation via a wellbore penetrating at least a portion of the subterranean formation. Optionally, the chelant comprises a chelant selected from the group consisting of methylglycine diacetic acid, glutamic acid diacetic acid, hydroxyl iminodisuccinic acid, iminodisuccinic acid, hydroxyethylene diaminetetraacetic acid, and any combination thereof. Optionally, the hydrofluoric acid is present from approximately 0.4% to approximately 4% by weight of the treatment fluid. Optionally, the corrosion inhibitor comprises a corrosion inhibitor selected from the group consisting of an acetylenic alcohol, a Mannich condensation product, an unsaturated carbonyl compound, an unsaturated ether compound, a formamide, a formate, a carbonyl compound, a terpene, an aromatic hydrocarbon, a cinnamaldehyde, a cinnamaldehyde derivative, a fluorinated surfactant, a quaternary derivative of heterocyclic nitrogen base, a quaternary derivative of a halomethylated aromatic compound, and any combination thereof. Optionally, the hydrofluoric acid is generated in situ using a hydrofluoric acid generating compound. Optionally, a metallurgic component that comprises titanium is present in the wellbore. Optionally, the treatment fluid is introduced into the wellbore using a pump.

Another embodiment of the present disclosure is a composition comprising: an aqueous base fluid; at least one chelant; hydrofluoric acid; at least one corrosion inhibitor; and a boron-containing compound. Optionally, the chelant comprises methylglycine diacetic acid. Optionally, the chelant comprises a chelant selected from the group consisting of: methylglycine diacetic acid, glutamic acid diacetic acid, hydroxyl iminodisuccinic acid, iminodisuccinic acid, hydroxyethylene diaminetetraacetic acid, and any combination thereof. Optionally, the chelant is present from approximately 1% to approximately 30% by weight of the composition. Optionally, the hydrofluoric acid is present from approximately 0.4% to approximately 4% by weight of the composition. Optionally, corrosion inhibitor comprises a corrosion inhibitor selected from the group consisting of: an acetylenic alcohol, a Mannich condensation product, an unsaturated carbonyl compound, an unsaturated ether compound, a formamide, a formate, a carbonyl compound, a terpene, an aromatic hydrocarbon, a cinnamaldehyde, a cinnamaldehyde derivative, a fluorinated surfactant, a quaternary derivative of heterocyclic nitrogen base, a quaternary derivative of a halomethylated aromatic compound, and any combination thereof.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    providing a treatment fluid comprising:
        an aqueous base fluid;
        at least one chelant;
        hydrofluoric acid; and
        at least one corrosion inhibitor;
    pumping the treatment fluid through a subsea riser system, wherein the subsea riser system comprises titanium; and
    introducing the treatment fluid into a subterranean formation.

2. The method of claim 1 wherein the chelant comprises a chelant selected from the group consisting of: methylglycine diacetic acid, glutamic acid diacetic acid, hydroxyl iminodisuccinic acid, iminodisuccinic acid, hydroxyethylene diaminetetraacetic acid, and any combination thereof.

3. The method of claim 1 wherein the hydrofluoric acid is present from about 0.4% to about 4% by weight of the treatment fluid.

4. The method of claim 1 wherein the corrosion inhibitor comprises a corrosion inhibitor selected from the group consisting of: an acetylenic alcohol, a Mannich condensation product, an unsaturated carbonyl compound, an unsaturated ether compound, a formamide, a formate, a carbonyl compound, a terpene, an aromatic hydrocarbon, cinnamaldehyde, a cinnamaldehyde derivative, a fluorinated surfactant, a quaternary derivative of heterocyclic nitrogen base, a quaternary derivative of a halomethylated aromatic compound, and any combination thereof.

5. The method of claim 1 wherein the hydrofluoric acid is generated using a hydrofluoric acid generating compound.

6. The method of claim 1 wherein the treatment fluid is injected into the subterranean formation using a pump.

7. A method comprising:
    providing a treatment fluid comprising:
        an aqueous base;
        at least one chelant;
        hydrofluoric acid; and
        at least one corrosion inhibitor; and
        a boron-containing compound; and
    introducing the treatment fluid into a subterranean formation via a wellbore penetrating at least a portion of the subterranean formation, wherein a metallurgic component that comprises titanium is present in the wellbore.

8. The method of claim 7 wherein the chelant comprises a chelant selected from the group consisting of methylglycine diacetic acid, glutamic acid diacetic acid, hydroxyl iminodisuccinic acid, iminodisuccinic acid, hydroxyethylene diaminetetraacetic acid, and any combination thereof.

9. The method of claim 7 wherein the hydrofluoric acid is present from approximately 0.4% to approximately 4% by weight of the treatment fluid.

10. The method of claim 7 wherein the corrosion inhibitor comprises a corrosion inhibitor selected from the group consisting of an acetylenic alcohol, a Mannich condensation product, an unsaturated carbonyl compound, an unsaturated ether compound, a formamide, a formate, a carbonyl compound, a terpene, an aromatic hydrocarbon, a cinnamaldehyde, a cinnamaldehyde derivative, a fluorinated surfactant, a quaternary derivative of heterocyclic nitrogen base, a quaternary derivative of a halomethylated aromatic compound, and any combination thereof.

11. The method of claim 7 wherein the hydrofluoric acid is generated in situ using a hydrofluoric acid generating compound.

12. The method of claim 7 wherein the treatment fluid is introduced into the wellbore using a pump.

* * * * *